US012429718B1

(12) United States Patent
Karimelahi et al.

(10) Patent No.: US 12,429,718 B1
(45) Date of Patent: Sep. 30, 2025

(54) ULTRA-HIGH BANDWIDTH MULTI-JUNCTION SILICON OPTICAL MODULATOR

(71) Applicant: MARVELL ASIA PTE LTD, Singapore (SG)

(72) Inventors: Samira Karimelahi, Los Gatos, CA (US); Masaki Kato, Palo Alto, CA (US)

(73) Assignee: MARVELL ASIA PTE LTD, Singapore (SG)

( * ) Notice: Subject to any disclaimer, the term of this patent is extended or adjusted under 35 U.S.C. 154(b) by 305 days.

(21) Appl. No.: 18/205,221

(22) Filed: Jun. 2, 2023

Related U.S. Application Data

(60) Provisional application No. 63/354,708, filed on Jun. 23, 2022.

(51) Int. Cl.
*G02F 1/025* (2006.01)
*G02F 1/015* (2006.01)

(52) U.S. Cl.
CPC ............ *G02F 1/025* (2013.01); *G02F 1/0151* (2021.01)

(58) Field of Classification Search
CPC ...... G02F 1/025; G02F 1/2255; G02F 1/2257; G02F 2202/32
USPC ....................................................... 385/1–3
See application file for complete search history.

(56) References Cited

U.S. PATENT DOCUMENTS

| | | | | |
|---|---|---|---|---|
| 7,116,853 | B2* | 10/2006 | Gunn, III | G02F 1/025 |
| | | | | 257/499 |
| 9,235,068 | B2* | 1/2016 | Manouvrier | G02F 1/2257 |
| 12,228,808 | B2* | 2/2025 | Pishvaibazargani | |
| | | | | G02F 1/0151 |
| 2009/0263078 | A1* | 10/2009 | Hosomi | G02B 6/12004 |
| | | | | 385/14 |
| 2014/0355925 | A1* | 12/2014 | Manouvrier | G02B 6/12 |
| | | | | 438/31 |
| 2015/0093067 | A1* | 4/2015 | Manouvrier | G02F 1/025 |
| | | | | 385/3 |
| 2017/0285437 | A1* | 10/2017 | Doerr | G02F 1/2257 |
| 2017/0315421 | A1* | 11/2017 | Popovic | G02F 1/025 |
| 2018/0210242 | A1* | 7/2018 | Baehr-Jones | G02F 1/015 |
| 2021/0072614 | A1* | 3/2021 | Yoo | G02F 1/2257 |
| 2023/0152662 | A1* | 5/2023 | Doerr | G02F 1/212 |
| | | | | 385/2 |

FOREIGN PATENT DOCUMENTS

WO    WO 2016/165608 A1 * 10/2016 ............ G02F 1/025

\* cited by examiner

*Primary Examiner* — Robert Tavlykaev

(57) ABSTRACT

An optical modulator includes a substrate defining a plane and first, second, and third PN junctions formed on the substrate. The first PN junction is formed on the substrate by a first region doped with a p-type doping abutting a second region doped with an n-type doping. The second PN junction is formed on the substrate adjacent to the second region of the first PN junction. The third PN junction is formed on the substrate adjacent to the first region of the first PN junction.

24 Claims, 5 Drawing Sheets

ULTRA-HIGH BANDWIDTH MULTI-JUNCTION SILICON OPTICAL MODULATOR

CROSS-REFERENCE TO RELATED APPLICATIONS

This application claims the benefit of U.S. Provisional Application No. 63/354,708, filed on Jun. 23, 2022. The entire disclosure of the application referenced above is incorporated herein by reference.

FIELD

The present disclosure relates generally to optical communication systems and more particularly to an ultra-high bandwidth multi-junction silicon optical modulator.

BACKGROUND

The background description provided herein is for the purpose of generally presenting the context of the disclosure. Work of the presently named inventor, to the extent the work is described in this background section, as well as aspects of the description that may not otherwise qualify as prior art at the time of filing, are neither expressly nor impliedly admitted as prior art against the present disclosure.

An optical modulator is a device used to modulate a light beam propagated through an optical waveguide. Depending on a parameter of the light beam to be modulated, optical modulators may be called amplitude modulators, phase modulators, polarization modulators etc. One way to modulate intensity of a light beam is to modulate a current driving the light source such as a laser diode. This type of modulation is called direct modulation. Alternatively, a light beam propagating through an optical modulator can be modulated by externally applying a voltage to the optical modulator. Such modulators are called electro-optical modulators.

SUMMARY

An optical modulator comprises a substrate defining a plane and first, second, and third PN junctions formed on the substrate. The first PN junction is formed on the substrate by a first region doped with a p-type doping abutting a second region doped with an n-type doping. The second PN junction is formed on the substrate adjacent to the second region of the first PN junction. The third PN junction is formed on the substrate adjacent to the first region of the first PN junction.

In other features, the first region and the second region are L-shaped.

In other features, the second PN junction is formed by a third region doped with an n-type doping disposed on the substrate adjacent to the second region of the first PN junction and a fourth region doped with a p-type doping disposed on the substrate abutting the third region. The n-type doping of the third region being of a different doping concentration than the n-type doping of the second region. The third PN junction is formed by a fifth region doped with a p-type doping disposed on the substrate adjacent to the first region of the first PN junction and a sixth region doped with an n-type doping disposed on the substrate abutting the fifth region. The p-type doping of the fifth region is of a different doping concentration than the p-type doping of the first region.

In other features, each of the first region and the second region comprises a respective first portion and a respective second portion. Each first portion is elongated along an axis perpendicular to the substrate, and each second portion is elongated along an axis parallel to the substrate. Each of the third, fourth, fifth, and sixth regions has the same dimension along the axis perpendicular to the substrate as the second portions of the first region and the second region.

In other features, each of the first region and the second region comprises a first portion and a second portion. The first portion is elongated along an axis perpendicular to the substrate, and the second portion is elongated along an axis parallel to the substrate. The first portions of the first region and the second region have a longer dimension along the axis perpendicular to the substrate than the second portions of the first region and the second region. Each of the third and fifth regions has a longer dimension along the axis perpendicular to the substrate than the second portions of the first region and the second region. Each of the fourth and sixth regions has a longer dimension along the axis perpendicular to the substrate than the third and fifth regions.

In other features, the third region has a higher doping concentration than the second region. The sixth region has a higher doping concentration than the third region. The fifth region has a higher doping concentration than the first region. The fourth region has a higher doping concentration than the fifth region.

In other features, dimensions of the second portion of the second region and the third and fourth regions along the axis parallel to the substrate are the same as the dimensions of the second portion of the first region and the fifth and sixth regions along the axis parallel to the substrate, respectively.

In other features, dimensions of the second portion of the second region and the third and fourth regions along the axis parallel to the substrate decrease as distances of the second portion of the second region and the third and fourth regions along the axis parallel to the substrate increase from the first PN junction. Dimensions of the second portion of the first region and the fifth and sixth regions along the axis parallel to the substrate decrease as distances of the second portion of the first region and the fifth and sixth regions along the axis parallel to the substrate increase from the first PN junction.

In other features, the optical modulator further comprises fourth and fifth PN junctions. The fourth PN junction is formed by the fourth region and the seventh region doped with an n-type doping disposed on the substrate abutting the fourth region. The fifth PN junction is formed by the sixth region and an eighth region doped with a p-type doping disposed on the substrate abutting the sixth region.

In other features, each of the first region and the second region comprises a first portion and a second portion. The first portion extends along an axis perpendicular to the substrate. The second portion extends along an axis parallel to the substrate. The first portions of the first region and the second region have a longer dimension along the axis perpendicular to the substrate than the second portions. Each of the third, fourth, fifth, sixth, seventh, and eighth regions has the same dimension along the axis perpendicular to the substrate as the second portions of the first region and the second region.

In other features, each of the first region and the second region comprises a first portion and a second portion. The first portion extends along an axis perpendicular to the substrate. The second portion extends along an axis parallel to the substrate. The first portions of the first region and the second region have a longer dimension along the axis perpendicular to the substrate than the second portions of the first region and the second region. Each of the third and fifth regions has a longer dimension along the axis perpendicular to the substrate than the second portions of the first region and the second region. Each of the fourth and sixth regions has a longer dimension along the axis perpendicular to the substrate than the third and fifth regions. Each of the seventh and eighth regions has the same dimension along the axis perpendicular to the substrate as the fourth and sixth regions.

In other features, the third region has a higher doping concentration than the second region. The sixth region has a higher doping concentration than the third region. The seventh region has a higher doping concentration than the sixth region. The fifth region has a higher doping concentration than the first region. The fourth region has a higher doping concentration than the fifth region. The eighth region has a higher doping concentration than the fourth region.

In other features, dimensions of the second portion of the second region and the third, fourth, and seventh regions along the axis parallel to the substrate are the same as the dimensions of the second portion of the first region and the fifth, sixth, and eighth regions along the axis parallel to the substrate, respectively.

In other features, dimensions of the second portion of the second region and the third, fourth, and seventh regions along the axis parallel to the substrate decrease as distances of the third, fourth, and seventh regions along the axis parallel to the substrate increase from the first PN junction. Dimensions of the second portion of the first region and the fifth, sixth, and eighth regions along the axis parallel to the substrate decrease as distances of the fifth, sixth, and eighth regions along the axis parallel to the substrate increase from the first PN junction.

In still other features, the first region comprises a first p-type doped portion and a second p-type doped portion, the second p-type doped portion abutting the first p-type doped portion and having a higher doping concentration than the first p-type doped portion. The second region comprises a first n-type doped portion and a second n-type doped portion, the second n-type doped portion abutting the first n-type doped portion and having a higher doping concentration than the first n-type doped portion.

In other features, the second PN junction is formed by a third region doped with a p-type doping disposed on the substrate adjacent to the second n-type doped portion of the first PN junction. The third region has a higher doping concentration than the second p-type doped portion of the first PN junction. The third PN junction is formed by a fourth region doped with an n-type doping disposed on the substrate adjacent to the second p-type doped portion of the first PN junction. The fourth region has a higher doping concentration than the second n-type doped portion of the first PN junction.

In other features, each of the second p-type doped portion and the second n-type doped portion comprises a first portion and a second portion. The first portion extends along an axis perpendicular to the substrate, and the second portion extends along an axis parallel to the substrate. The first portions of the second p-type doped portion and the second n-type doped portion have a longer dimension along the axis perpendicular to the substrate than the second portions of the second p-type doped portion and the second n-type doped portion. Each of the third and fourth regions has a longer dimension along the axis perpendicular to the substrate than the second portions of the second p-type doped portion and the second n-type doped portion.

In other features, the optical modulator further comprises fourth and fifth PN junctions. The fourth PN junction is formed by a fifth region doped with an n-type doping disposed on the substrate adjacent to the third region. The fifth region has a higher doping concentration than the fourth region and has a longer dimension along the axis perpendicular to the substrate than the third region. The fifth PN junction is formed by a sixth region doped with a p-type doping disposed on the substrate adjacent to the fourth region. The sixth region has a higher doping concentration than the third region and has a longer dimension along the axis perpendicular to the substrate than the fourth region.

In other features, dimensions of the second portion of the second n-type doped portion and the third and fifth regions along the axis parallel to the substrate are the same as the dimensions of the second portion of the second p-type doped portion and the fourth and sixth regions along the axis parallel to the substrate, respectively.

In other features, dimensions of the second portion of the second portion of the second n-type doped portion and the third and fifth regions along the axis parallel to the substrate decrease as distances of the second portion of the second n-type doped portion and the third and fifth regions along the axis parallel to the substrate increase from the first PN junction. Dimensions of the second portion of the second p-type doped portion and the fourth and sixth regions along the axis parallel to the substrate decrease as distances of the second portion of the second p-type doped portion and the fourth and sixth regions along the axis parallel to the substrate increase from the first PN junction.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Figure 1:
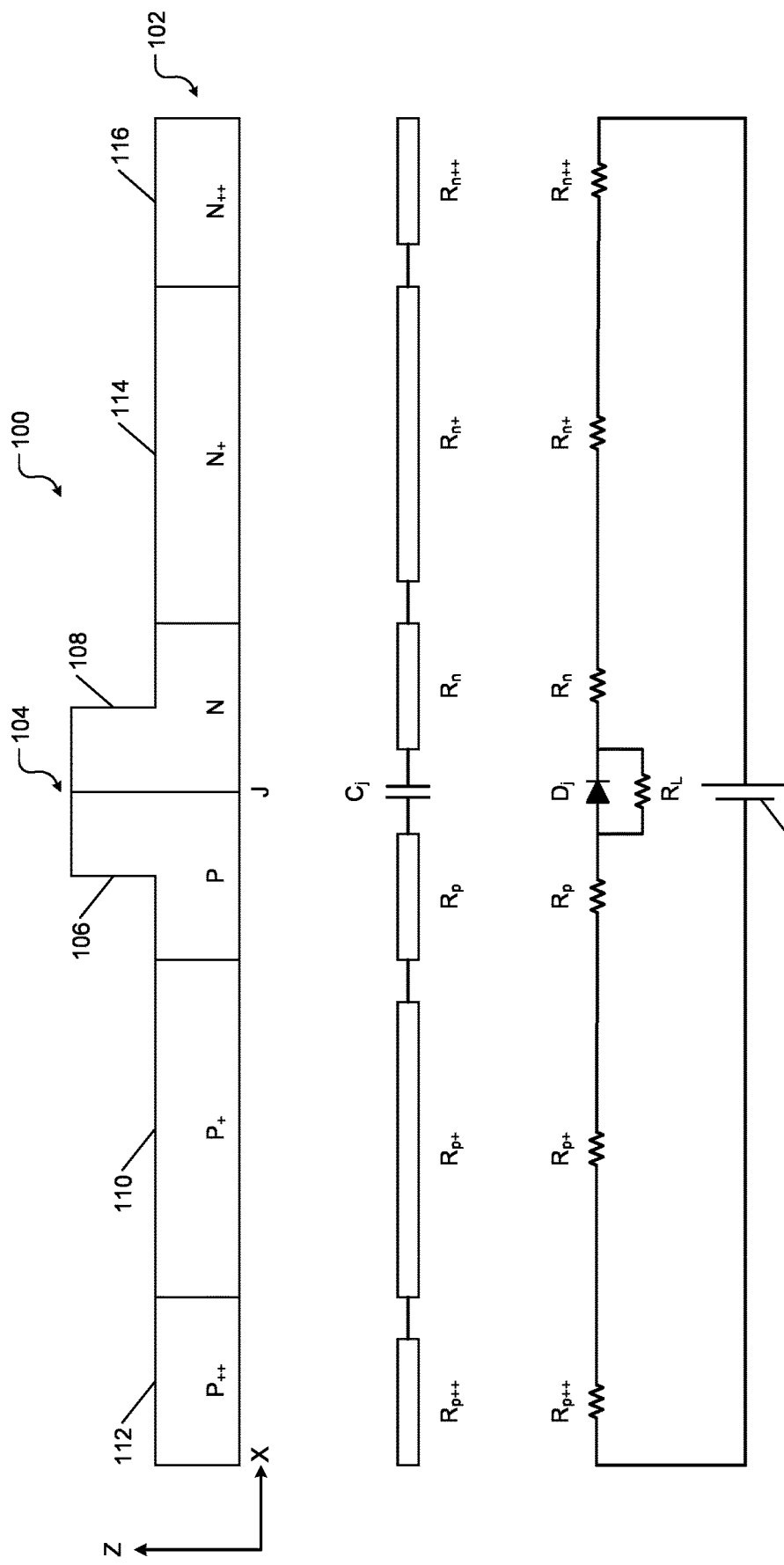
FIG. 1 shows an optical modulator comprising a PN junction formed by a p-type doped region and an n-type doped region, a plurality of p-type doped regions arranged on the side of the p-type doped region of the PN junction, and a plurality of n-type doped regions arranged on the side of the n-type doped region of the PN junction.

Electro-optical modulators are one of the key components in optical links used in optical communications. The performance of these optical modulators is measured using metrics such as modulation efficiency, optical loss, and bandwidth. Silicon-based optical modulators typically operate based on a plasma dispersion (free carrier) effect, where refractive index and optical loss of a waveguide of an optical modulator varies by carrier concentration in the waveguide. Therefore, by controlling carrier distribution in the waveguide with externally applied voltage, which changes the refractive index in the waveguide, the phase and intensity of the light can be modulated. Since carrier injection into the waveguide limits the bandwidth of the optical modulator due to carrier life-time limitations, reverse-biased optical modulators are more commonly used, where reverse bias causes carrier depletion in the waveguide. To translate phase modulation to intensity modulation using changes in refractive index in the waveguide, commonly used optical modulator configurations are interferometers such as Mach-Zehnder modulator or resonance-based devices like ring modulators.

As described below in detail, the present disclosure provides various silicon-based optical modulator structures that improve the modulator bandwidth significantly by implementing a multi-PN-junction structure. The multi-PN-junction structure can be combined with multi-doped/multi-step etched-slab structures (described below in detail) to further improve the bandwidth while compensating loss in modulation efficiency that may occur by adding multiple PN-junctions.

Specifically, the present disclosure provides an optical modulator with a waveguide structure comprising alternately doped regions formed on a silicon substrate (slab). By alternating the doping type, several PN junctions are formed on the silicon substrate such that the PN junctions are connected to each other in series. Accordingly, junction capacitances of the PN junctions are connected in series, which reduces the total capacitance of the optical modulator. By reducing the total capacitance of the optical modulator, the bandwidth of the optical modulator is significantly improved. The geometries (e.g., distances relative to main PN junction, widths, heights, and cross-sectional areas) and doping concentrations of the alternately doped regions can be designed to minimize voltage drops across the PN junctions.

More specifically, the PN junctions form diodes with alternating polarities that are connected to each other in series. The diodes in series form a voltage divider and increase a turn on voltage of the main diode (i.e., the main PN junction) at the rib of the waveguide. The voltage drop across diodes other than the main diode is minimized through leakage paths of the other diodes so that the main diode receives maximum voltage. When a voltage is applied to the optical modulator, the main diode and some of the diodes are reverse biased while other diodes are forward biased. The forward-biased diodes have a lower bandwidth than the reverse-biased diodes due to carrier life-time limitation. However, since the diodes with different polarities are connected in series, the main diode, which is reverse biased, does not allow carriers to be injected to limit the bandwidth of the optical modulator.

The alternate doping types can be made symmetric or asymmetric on either side of the rib shaped waveguide of the optical modulator. Additionally, different doping levels (concentrations) can be used in different doped regions to decrease the series resistance of the waveguide to further improve the bandwidth of the optical modulator. For example, each intermediate doped region can have a higher doping level than a preceding intermediate doped region as the distance of each intermediate doped region from the rib increases.

In additional waveguide designs, to compensate for the voltage drop across the additional PN junctions, the slab thickness, and the geometry of the main waveguide can be designed to improve mode confinement in the rib. For example, increasing the ratio of waveguide height to the slab thickness can improve the modulation efficiency. Further, the slab of the waveguide can be etched such that the doped regions on either side of the rib can have different depths (heights). Such a slab is called a multi-etched slab. The electric field and confinement of the optical mode in the rib can be increased by using a thinner slab region close to the rib. This can significantly improve the modulation efficiency of the optical modulator. The increased confinement of the optical mode decreases the modulator loss.

Also, the multi-etch slab with doped regions having different depths allows increasing the slab thickness as well as the doping concentration as the distance of the doped regions from the rib increases. These features can compensate for higher series resistance close to the rib and help optimize the bandwidth of the modulator. For example, the multi-etch slab can have two or more etch depths. The multi-etch slab and alternate doping type can be symmetric or asymmetric on either side of the rib. Adding different doping types and concentrations in various slab regions of different thicknesses further optimizes the series resistance and not add noticeable excess loss due to better optical confinement. The optical modulators disclosed herein can be used to implement various optical modulator configurations such as a ring modulator and a Mach-Zehnder modulator. These and other features of the present disclosure are described below in further detail.

Throughout the following disclosure, the term horizontal means a direction along an x axis (depicted in FIGS. 1-5) that is parallel to a plane in which the slab lies, and the term vertical means a direction along a z axis (depicted in FIGS. 1-5) that is perpendicular to the plane in which the slab lies. A length of an element is a dimension of the element measured along the x axis that is parallel to the plane in which the slab lies. A height (i.e., thickness) of an element is a dimension of the element measured along the z axis that is perpendicular to the plane in which the slab lies.

FIG. 1 shows an optical modulator 100 comprising a waveguide 102 formed on a slab of silicon. An L-shaped PN junction 104 (denoted by J) is formed on the slab to form a rib of the waveguide 102. The L-shaped PN junction 104 is formed by joining a first L-shaped region 106 doped with a p-type doping and a second L-shaped region 108 doped with an n-type doping. Each of the first and second L-shaped regions 106, 108 includes a base portion that extends along an axis parallel to the slab (i.e., the x-axis depicted in FIG. 1) and a vertical portion extending from the base portion, where the vertical portion extends along an axis perpendicular to the slab (i.e., the z-axis depicted in FIG. 1). The vertical portions of the first and second L-shaped regions 106, 108 are joined to form the L-shaped PN junction 104. Each of the first and second L-shaped regions 106, 108 is monolithic. That is, in each of the first and second L-shaped regions 106, 108, the base and vertical portions are not two pieces that are joined to each other but are one piece. In other words, each of the first and second L-shaped regions 106, 108 comprises a respective first portion (i.e., a respective vertical portion) and a respective second portion (i.e., a respective base portion). Each first portion is elongated along an axis perpendicular to the plane in which the slab lies (i.e., the z-axis depicted in FIG. 1), and each second portion is elongated along an axis parallel to the plane in which the slab lies (i.e., the x-axis depicted in FIG. 1).

A plurality of doped regions are disposed on the slab on either side of the L-shaped PN junction 104. For example, doped regions 110, 112 doped with a p-type doping are disposed on the side of the first L-shaped region 106 doped with the p-type doping, and doped regions 114, 116 doped with an n-type doping are disposed on the side of the second L-shaped region 108 doped with an n-type doping. The doping concentration of each of the doped regions 110, 112, 114, 116 increases as the distance of the respective doped region from the L-shaped PN junction 104 increases. For example, the first L-shaped region 106 has a doping concentration of P, the doped region 110 has a doping concentration of $P_+$, and the doped region 112 has a doping concentration of $P_{++}$, where $P_{++}>P_+>P$. The second L-shaped region 108 has a doping concentration of N, the doped region 114 has a doping concentration of $N_+$, and the doped region 116 has a doping concentration of $N_{++}$, where $N_{++}>N_+>N$.

The equivalent circuit of the optical modulator 100 comprises a capacitance of the L-shaped PN junction 104; resistances of the first and second L-shaped regions 106, 108; and resistances of the doped regions 110, 112, 114, 116 connected in series with each other. The L-shaped PN junction 104 has a capacitance $C_j$. The first L-shaped region 106 has a resistance $R_p$. The second L-shaped region 108 has a resistance $R_n$. The doped region 110 has a resistance $R_{p+}$, and the doped region 112 has a resistance $R_{p++}$, where $R_p>R_{p+}>R_{p++}$. The doped region 114 has a resistance $R_{n+}$, and the doped region 116 has a resistance $R_{n++}$, where $R_n>R_{n+}>R_{n++}$. The L-shaped PN junction 104 forms a diode $D_j$ and has a leakage resistance $R_L$. In use, a voltage source 120 is connected across the optical modulator 100 to reverse bias the diode $D_j$. The modulation efficiency, optical loss, and bandwidth of the optical modulator 100 are limited. The following designs provide optical modulators with improved modulation efficiency, optical loss, and bandwidth.

Figure 2:
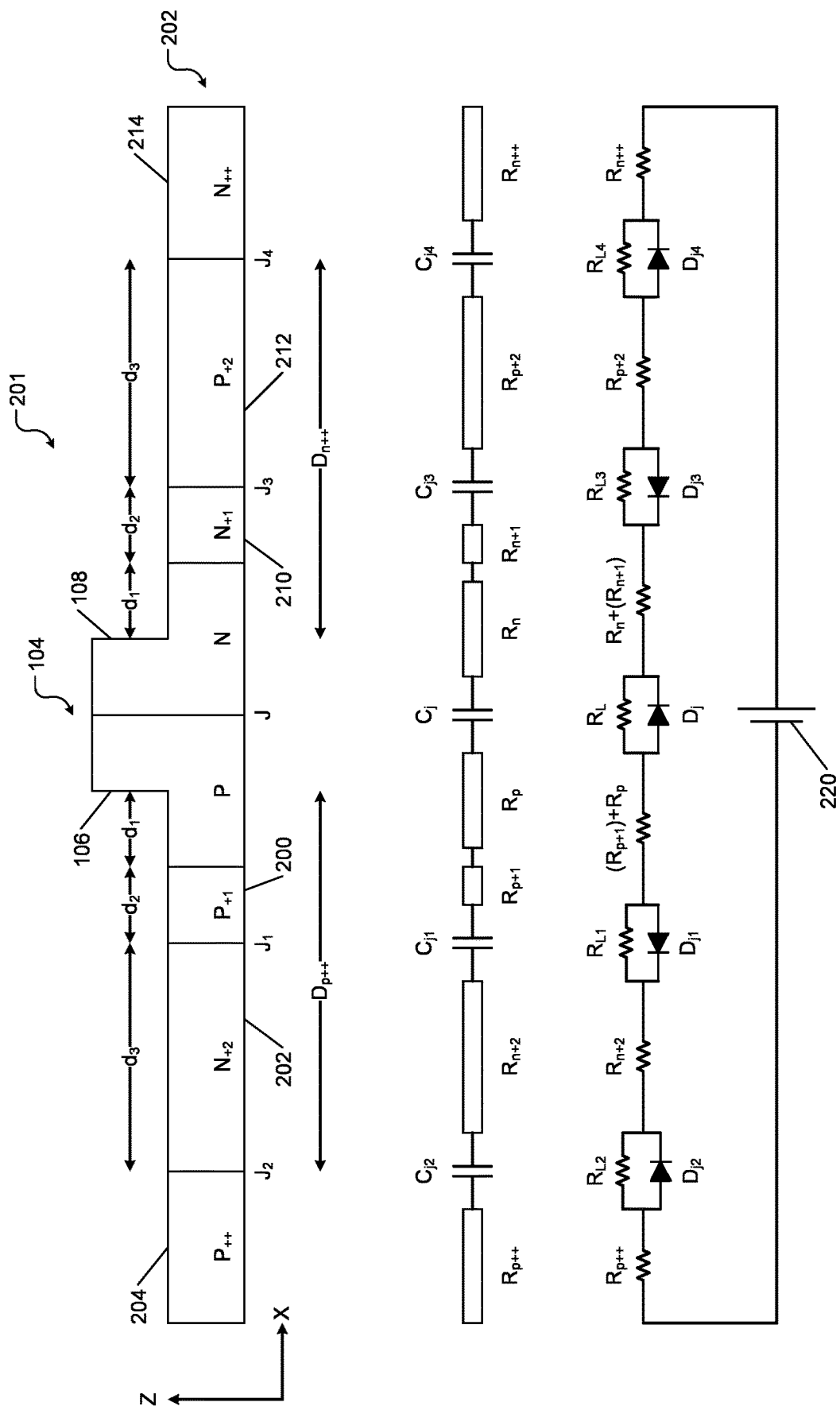
FIG. 2 shows an example of an optical modulator comprising a main PN junction and a plurality PN junctions formed by a plurality of doped regions of alternating polarities disposed on either side of the main PN junction.

FIG. 2 shows an optical modulator 201 according to the present disclosure. The optical modulator 201 comprises a waveguide 202 formed on a slab of silicon. The optical modulator 201 comprises the same L-shaped PN junction 104 of the optical modulator 100 shown in FIG. 1. Therefore, the L-shaped PN junction 104 is not described again for brevity. The optical modulator 201 differs from the optical modulator 100 shown in FIG. 1 in that the optical modulator 201 comprises a plurality of doped regions of alternating doping types disposed on each side of the first and second L-shaped regions 106, 108 of the L-shaped PN junction 104. The doped regions of alternating doping types form additional PN junctions on each side of the first and second L-shaped regions 106, 108 of the L-shaped PN junction 104 as described below.

For example, doped regions 200, 202, and 204 disposed on the left side of the first L-shaped region 106 and doped regions 210, 212, 214 disposed on the right side of the second L-shaped region 108. On the left side of the L-shaped PN junction 104, the doped region 200 abuts the base portion of the first L-shaped region 106 of the L-shaped PN junction 104. The doped region 202 abuts the doped region 200. The doped region 204 abuts the doped region 202. The doped region 200 the has the same type of doping (p-type) as the first L-shaped region 106 of the L-shaped PN junction 104. The doped region 202 has an opposite type of doping (n-type) than the doped region 200. The doped region 204 has an opposite type of doping (p-type) than the doped region 202. The doped regions 200 and 202 form a PN junction $J_1$, and the doped regions 202 and 204 form a PN junction $J_2$.

The base portion of the first L-shaped region 106 of the L-shaped PN junction 104 extends horizontally to a distance $d_1$ from an outer edge of the vertical portion of the first L-shaped region 106 of the L-shaped PN junction 104. The doped region 200 extends horizontally from the base portion of the first L-shaped region 106 of the L-shaped PN junction 104 to a distance $d_2$. The doped region 202 extends from the doped region 200 horizontally to a distance $d_3$. The doped region 204 extends horizontally from the doped region 202. The base portion of the first L-shaped region 106 of the L-shaped PN junction 104 and the doped regions 200, 202, 204 are coplanar. The base portion of the first L-shaped region 106 of the L-shaped PN junction 104 and the doped regions 200, 202, 204 have the same height (i.e., thickness measured along an axis perpendicular to the plane in which the slab lies (i.e., the z-axis depicted in FIG. 2)).

On the right side of the L-shaped PN junction 104, as depicted in FIG. 2, the doped region 210 abuts the second L-shaped region 108 of the L-shaped PN junction 104. The doped region 212 abuts the doped region 210. The doped region 214 abuts the doped region 212. The doped region 210 has the same type of doping (n-type) as the second L-shaped region 108 of the L-shaped PN junction 104. The doped region 212 has an opposite type of doping (p-type) than the doped region 210. The doped region 214 has an opposite type of doping (n-type) than the doped region 212. The doped regions 210 and 212 form a PN junction $J_3$, and the doped regions 212 and 214 form a PN junction $J_4$.

The base portion of the second L-shaped region 108 of the L-shaped PN junction 104 extends horizontally to a distance $d_1$ from an outer edge of the vertical portion of the second L-shaped region 108 of the L-shaped PN junction 104. The doped region 210 extends horizontally from the base portion of the second L-shaped region 108 of the L-shaped PN junction 104 to a distance $d_2$. The doped region 212 extends from the doped region 210 horizontally to a distance $d_3$. The doped region 214 extends horizontally from the doped region 212. The base portion of the second L-shaped region 108 of the L-shaped PN junction 104 and the doped regions 210, 212, 214 are coplanar. The base portions of the first and second L-shaped regions 106, 108 of the L-shaped PN junction 104 and the doped regions 200, 202, 204, 210, 212, 214 are coplanar. The base portions of the first and second L-shaped regions 106, 108 of the L-shaped PN junction 104 and the doped regions 200, 202, 204, 210, 212, 214 have the same height (i.e., thickness measured along an axis perpendicular to the plane in which the slab lies (i.e., the z-axis depicted in FIG. 2)).

The doping concentration (i.e., the doping level) $P_{+1}$ of the doped region 200 is greater than the doping concentration P of the first L-shaped region 106 of the L-shaped PN junction 104. The doping concentration $N_{+1}$ of the doped region 210 is greater than the doping concentration N of the second L-shaped region 108 of the L-shaped PN junction 104. The doping concentration $N_{+2}$ of the doped region 202 is greater than the doping concentration $N_{+1}$ of the doped region 210. The doping concentration $P_{+2}$ of the doped region 212 is greater than the doping concentration $P_{+1}$ of the doped region 200. The doping concentration $P_{++}$ of the doped region 204 is greater than the doping concentration $P_{+2}$ of the doped region 212. The doping concentration $N_{++}$ of the doped region 214 is greater than the doping concentration $N_{+2}$ of the doped region 202. $P_{++}>P_{+2}>P_{+1}>P$, and $N_{++}>N_{+2}>N_{+1}>N$.

Further, the doping concentrations of the doped regions 200, 202, 204 increase as the distance of the doped regions 200, 202, 204 increases from the L-shaped PN junction 104. Additionally, the doping types of the doped regions 200, 202, 204 also alternate as the distance of the doped regions 200, 202, 204 increases from the L-shaped PN junction 104. That is, $P_{++}>N_{+2}>P_{+1}>P$. The doping concentrations of the doped regions 210, 212, 214 increase as the distance of the doped regions 210, 212, 214 increases from the L-shaped PN junction 104. Additionally, the doping types of the doped regions 210, 212, 214 also alternate as the distance of the doped regions 210, 212, 214 increases from the L-shaped PN junction 104. That is, $N_{++}>P_{+2}>N_{+1}>N$.

Furthermore, while not shown, the lengths of the doped regions 200, 202, 204 along a horizontal axis (i.e., an axis parallel to the slab or the x-axis depicted in FIG. 2) can be decreased as the distance of the doped regions 200, 202, 204 increases from the L-shaped PN junction 104. That is, the length of the doped region 204 can be less than the length of the doped region 202, and the length of the doped region 202 can be less than the length of the doped region 200. In other words, $d_1>d_2>d_3$ and so on.

Similarly, the lengths of the doped regions 210, 212, 214 along the horizontal axis (i.e., the x-axis depicted in FIG. 2) can be decreased as the distance of the doped regions 210, 212, 214 increases from the L-shaped PN junction 104. That is, the length of the doped region 214 can be less than the length of the doped region 212, and the length of the doped region 212 can be less than the length of the doped region 210. In other words, $d_1>d_2>d_3$ and so on.

The combination of increasing doping levels in the doped regions 200, 202, 204, 210, 212, 214 and decreasing lengths of the doped regions 200, 202, 204, 210, 212, 214 as the distance of the doped regions 200, 202, 204, 210, 212, 214 increases from the L-shaped PN junction 104 reduces the resistance of the optical modulator 201 and makes the optical modulator 201 compact.

The equivalent circuit of the optical modulator 201 comprises a capacitance of the L-shaped PN junction 104; resistances of the first and second L-shaped regions 106, 108; capacitances of the PN junctions $J_1$, $J_2$, $J_3$, $J_4$; and resistances of the doped regions 200, 202, 204, 210, 212, 214 connected in series with each other. The L-shaped PN junction 104 J has a capacitance $C_j$. The first L-shaped region 106 has a resistance $R_p$. The second L-shaped region 108 has a resistance $R_n$. The PN junctions $J_1$, $J_2$, $J_3$, $J_4$ have capacitances $C_{j1}$, $C_{j2}$, $C_{j3}$, $C_{j4}$, respectively. The doped region 200 has a resistance $R_{p+1}$, the doped region 212 has a resistance $R_{p+2}$, and the doped region 204 has a resistance $R_{p++}$, where $R_p>R_{p+1}>R_{p+2}>R_{p++}$. The doped region 210 has a resistance $R_{n+1}$, the doped region 202 has a resistance $R_{n+2}$, and the doped region 214 has a resistance $R_{n++}$, where $R_n>R_{n+1}>R_{n+2}>R_{n++}$.

The L-shaped PN junction 104 J forms a diode $D_j$ having a leakage resistance $R_L$. The PN junctions $J_1$, $J_2$, $J_3$, $J_4$ form diodes PN junctions $D_{j1}$, $D_{j2}$, $D_{j3}$, $D_{j4}$ having leakage resistances $R_{L1}$, $R_{L2}$, $R_{L3}$, $R_{L4}$, respectively. The diodes $D_j$, $D_{j2}$, and $D_{j4}$ have the same polarity that is opposite to the polarity of the diodes $D_{j1}$, $D_{j3}$. In use, a voltage source 220 is connected across the optical modulator 201 to reverse bias the diode $D_j$. Due to the polarities of the $D_{j1}$, $D_{j2}$, $D_{j3}$, $D_{j4}$, when the voltage source 220 is connected across the optical modulator 201 to reverse bias the diode $D_j$, the diodes $D_j$, $D_{j2}$, and $D_{j4}$ are reverse biased, and the diodes $D_{j1}$, $D_{j3}$ are forward biased.

While the alternately doped regions 200, 202, 204, 210, 212, 214 are shown symmetrically arranged on either side of the L-shaped PN junction 104, the alternately doped regions can also be arranged asymmetrically on either side of the L-shaped PN junction 104. For example, the number of doped regions on either side of the L-shaped PN junction 104 need not be symmetrical. Further, the doping concentrations in the doped regions on either side of the L-shaped PN junction 104 need not increase symmetrically and may be varied differently than that described above. Furthermore, the lengths of doped regions on either side of the L-shaped PN junction 104 need not decrease symmetrically and may be varied differently than that described above.

Figure 3:
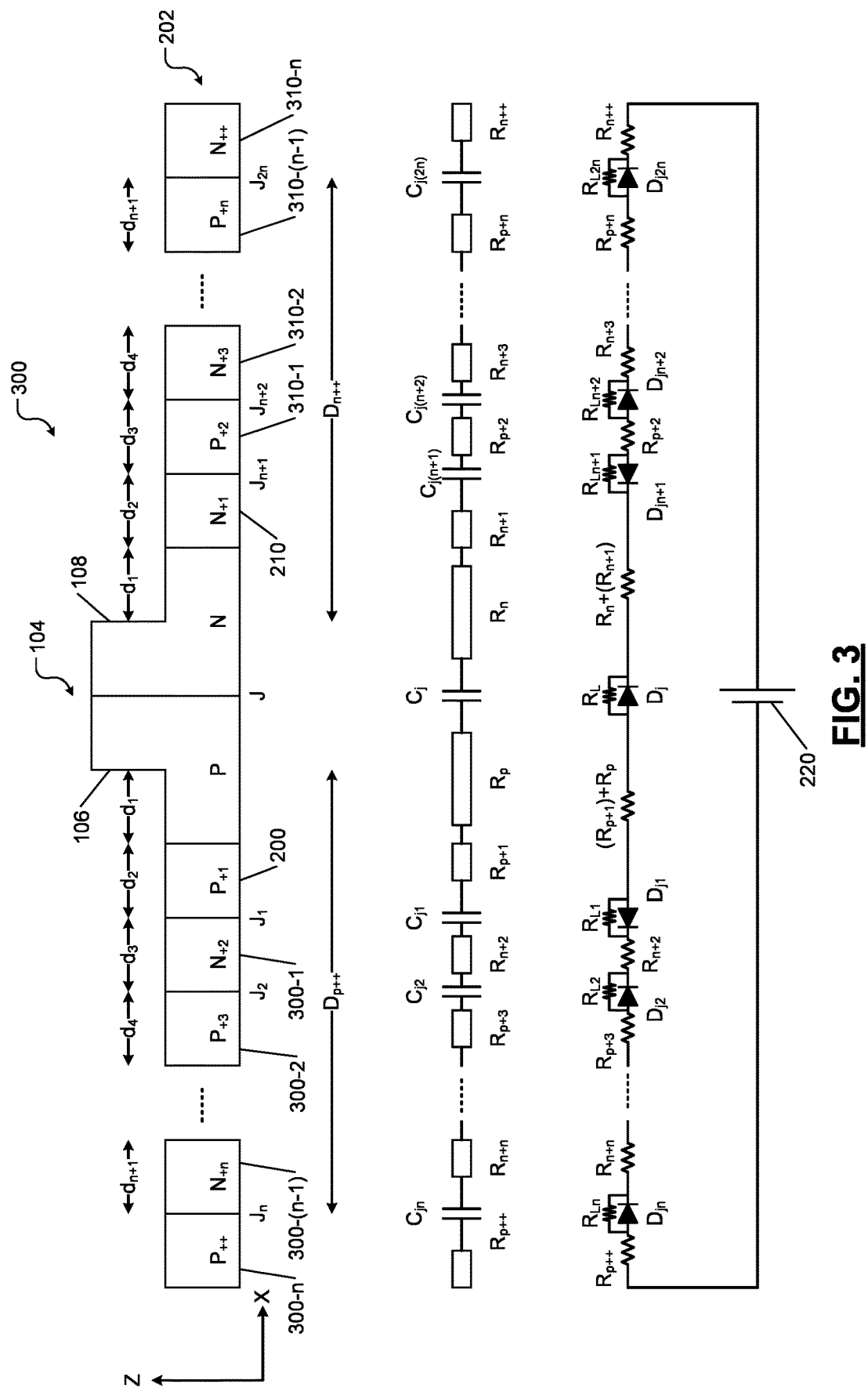
FIG. 3 shows an example of an optical modulator with more PN junctions disposed on either side of the main PN junction than those shown in FIG. 2.

FIG. 3 shows an optical modulator 300 according to the present disclosure. The optical modulator 300 extends the optical modulator 201 shown in FIG. 2 by adding more PN junctions on either side of the L-shaped PN junction 104 than those shown in FIG. 2. The optical modulator 300 comprises 2n+1 PN junctions comprising the L-shaped PN junction 104 and n PN junctions on each side of the L-shaped PN junction 104. The optical modulator 300 comprises the same L-shaped PN junction 104 of the optical modulator 100 shown in FIG. 1. Therefore, the L-shaped PN junction 104 is not described again for brevity.

The optical modulator 300 comprises doped regions 200, 300-1, 300-2, . . . , 300-(n−1), and 300-n disposed on the left side of the first L-shaped region 106 and doped regions 210, 310-1, 310-2, . . . , 310-(n−1), and 310-n disposed on the right side of the second L-shaped region 108. On the left side of the L-shaped PN junction 104, the doped region 200 abuts the base portion of the first L-shaped region 106 of the L-shaped PN junction 104. The doped region 300-1 abuts the doped region 200. The doped region 300-2 abuts the doped region 300-2, and so on. The doped region 300-n abuts the doped region 300-(n−1). The doped region 200 the has the same type of doping (p-type) as the first L-shaped region 106 of the L-shaped PN junction 104. The doped region 300-1 has an opposite type of doping (n-type) than the doped region 200. The doped region 300-2 has an opposite type of doping (p-type) than the doped region 300-1, and so on. The doped region 300-n has an opposite type of doping (p-type) than the doped region 300-(n−1), which is n-type. The doped regions 200 and 300-1 form a PN junction $J_1$, the doped regions 300-1 and 300-2 form a PN junction $J_2$, and so on. The doped regions 300-(n−1) and 300-n form a PN junction $J_n$.

As depicted in FIG. 3, the base portion of the first L-shaped region 106 of the L-shaped PN junction 104 extends horizontally to a distance $d_1$ from an outer edge of the vertical portion of the first L-shaped region 106 of the L-shaped PN junction 104. The doped region 200 extends horizontally from the base portion of the first L-shaped region 106 of the L-shaped PN junction 104 to a distance $d_2$. The doped region 300-1 extends from the doped region 200 horizontally to a distance $d_3$. The doped region 300-2 extends horizontally from the doped region 300-1 to a distance $d_4$, and so on. The doped region 300-(n−1) extends horizontally from an immediately preceding doped region to a distance $d_{n+1}$. The doped region 300-n extends horizontally from the doped region 300-(n−1). The base portion of the first L-shaped region 106 of the L-shaped PN junction 104 and the doped regions 200, 300-1, 300-2, . . . , 300-(n−1), and 300-n are coplanar.

On the right side of the L-shaped PN junction 104, as depicted in FIG. 3, the doped region 210 abuts the base portion of the second L-shaped region 108 of the L-shaped PN junction 104. The doped region 310-1 abuts the doped region 210. The doped region 310-2 abuts the doped region 310-1, and so on. The doped region 310-n abuts the doped region 310-($n$–1). The doped region 210 the has the same type of doping (n-type) as the second L-shaped region 108 of the L-shaped PN junction 104. The doped region 310-1 has an opposite type of doping (p-type) than the doped region 210. The doped region 310-2 has an opposite type of doping (n-type) than the doped region 310-1, and so on. The doped region 310-$n$ has an opposite type of doping (n-type) than the doped region 310-($n$–1), which is p-type. The doped regions 210 and 310-1 form a PN junction $J_{n+1}$, the doped regions 310-1 and 310-2 form a PN junction $J_{n+2}$, and so on. The doped regions 310-($n$–1) and 310-$n$ form a PN junction $J_{2n}$.

The base portion of the second L-shaped region 108 of the L-shaped PN junction 104 extends horizontally to a distance $d_1$ from an outer edge of the vertical portion of the second L-shaped region 108 of the L-shaped PN junction 104. The doped region 210 extends horizontally from the base portion of the second L-shaped region 108 of the L-shaped PN junction 104 to a distance $d_2$. The doped region 310-1 extends from the doped region 210 horizontally to a distance $d_3$. The doped region 310-2 extends horizontally from the doped region 310-1 to a distance $d_4$, and so on. The doped region 310-($n$–1) extends horizontally from an immediately preceding doped region to a distance $d_{n+1}$. The doped region 310-$n$ extends horizontally from the doped region 300-($n$–1). The base portion of the second L-shaped region 108 of the L-shaped PN junction 104 and the doped regions 210, 310-1, 310-2, . . . , 310-($n$–1), and 310-$n$ are coplanar. The base portions of the first and second L-shaped regions 106, 108 of the L-shaped PN junction 104; the doped regions 200, 300-1, 300-2, . . . , 300-($n$–1), and 300-$n$; and the doped regions 210, 310-1, 310-2, . . . , 310-($n$–1), and 310-$n$ are coplanar.

The doping concentration (i.e., the doping level) $P_{+1}$ of the doped region 200 is greater than the doping concentration P of the first L-shaped region 106 of the L-shaped PN junction 104. The doping concentration $N_{+1}$ of the doped region 210 is greater than the doping concentration N of the second L-shaped region 108 of the L-shaped PN junction 104. The doping concentration $N_{+2}$ of the doped region 300-1 is greater than the doping concentration $N_{+1}$ of the doped region 210. The doping concentration $P_{+2}$ of the doped region 310-1 is greater than the doping concentration $P_{+1}$ of the doped region 200. The doping concentration $P_{+3}$ of the doped region 300-2 is greater than the doping concentration $P_{+2}$ of the doped region 310-1. The doping concentration $N_{+3}$ of the doped region 310-2 is greater than the doping concentration $N_{+2}$ of the doped region 300-1, and so on. The doping concentration $P_{++}$ of the doped region 300-$n$ is greater than the doping concentration $P_{+n}$ of the doped region 310-($n$–1). The doping concentration $N_{++}$ of the doped region 310-$n$ is greater than the doping concentration $N_{+n}$ of the doped region 300-($n$–1). $P_{++} > P_{+n} > \ldots P_{+3} > P_{+2} > P_{+1} > P$, and $N_{++} > N_{+n} > \ldots N_{+3} > N_{+2} > N_{+1} > N$.

Further, the doping concentrations of the doped regions 200, 310-1, 310-2, . . . , 310-($n$–1), and 310-$n$ increase and the doping types of the doped regions 200, 310-1, 310-2, . . . , 310-($n$–1), and 310-$n$ alternate as the distance of the doped regions 200, 310-1, 310-2, . . . , 310-($n$–1), and 310-$n$ increases from the L-shaped PN junction 104. That is, $P_{++} > N_{+n} > \ldots > P_{+3} > N_{+2} > P_{+1} > P$. The doping concentrations of the doped regions 210, 310-1, 310-2, . . . , 310-($n$–1), and 310-$n$ increase and the doping types of the doped regions 210, 310-1, 310-2, . . . , 310-($n$–1), and 310-$n$ alternate as the distance of the doped regions 210, 310-1, 310-2, . . . , 310-($n$–1), and 310-$n$ increases from the L-shaped PN junction 104. That is, $N_{++} > P_{+n} > \ldots > N_{+3} > P_{+2} > N_{+1} > N$.

Furthermore, while not shown, the lengths of the doped regions 200, 310-1, 310-2, . . . , 310-($n$–1), and 310-$n$ along the horizontal axis (i.e., the x-axis depicted in FIG. 3) can be decreased as the distance of the doped regions 200, 310-1, 310-2, . . . , 310-($n$–1), and 310-$n$ increases from the L-shaped PN junction 104. That is, the length of the doped region 300-$n$ can be less than the length of the doped region 300-($n$–1), and so on, the length of the doped region 300-2 can be less than the length of the doped region 300-1, and the length of the doped region 300-1 can be less than the length of the doped region 200. In other words, $d_1 > d_2 > d_3$ and so on.

Similarly, the lengths of the doped regions 210, 310-1, 310-2, . . . , 310-($n$–1), and 310-$n$ along the horizontal axis (i.e., the x-axis depicted in FIG. 3) can be decreased as the distance of the doped regions 210, 310-1, 310-2, . . . , 310-($n$–1), and 310-$n$ increases from the L-shaped PN junction 104. That is, the length of the doped region 310-$n$ can be less than the length of the doped region 310-($n$–1), and so on, the length of the doped region 310-2 can be less than the length of the doped region 310-1, and the length of the doped region 310-1 can be less than the length of the doped region 210. In other words, $d_1 > d_2 > d_3$ and so on.

The combination of increasing doping levels in the doped regions 200, 300-1, 300-2, . . . , 300-($n$–1), and 300-$n$, 210, 310-1, 310-2, . . . , 310-($n$–1), and 310-$n$ and decreasing lengths of the doped regions 200, 300-1, 300-2, . . . , 300-($n$–1), 300-$n$, 210, 310-1, 310-2, . . . , 310-($n$–1), and 310-$n$ as the distance of the doped regions 200, 300-1, 300-2, . . . , 300-($n$–1), and 300-$n$, 210, 310-1, 310-2, . . . , 310-($n$–1), and 310-$n$ increases from the L-shaped PN junction 104 reduces the resistance of the optical modulator 300 and makes the optical modulator 300 compact.

The equivalent circuit of the optical modulator 300 comprises a capacitance of the L-shaped PN junction 104; resistances of the first and second L-shaped regions 106, 108; capacitances of the PN junctions $J_1, J_2, \ldots, J_n, J_{n+1}, J_{n+2}, \ldots, J_{2n}$; and resistances of the doped regions 200, 300-1, 300-2, . . . , 300-($n$–1), 300-$n$, 210, 310-1, 310-2, . . . , 310-($n$–1), and 310-$n$ connected in series with each other. The L-shaped PN junction 104 J has a capacitance $C_j$. The first L-shaped region 106 has a resistance $R_p$. The second L-shaped region 108 has a resistance $R_n$. The PN junctions $J_1, J_2, \ldots, J_n, J_{n+1}, J_{n+2}, \ldots, J_{2n}$ have capacitances $C_{j1}, C_{j2}, \ldots, C_{Jn}, C_{J(n+1)}, C_{J(n+2)}, \ldots, C_{j2n}$, respectively.

The doped region 200 has a resistance $R_{p+1}$, the doped region 310-1 has a resistance $R_{p+2}$, the doped region 300-2 has a resistance $R_{p+3}$, and so on, the doped region 310-($n$–1) has a resistance $R_{p+n}$, and the doped region 300-$n$ has a resistance $R_{p++}$, where $R_p > R_{p+1} > R_{p+2} > R_{p+3}, \ldots, R_{p+n} > R_{p++}$. The doped region 210 has a resistance $R_{n+1}$, the doped region 300-1 has a resistance $R_{n+2}$, the doped region 310-2 has a resistance $R_{n+3}$, and so on, the doped region 300-($n$–1) has a resistance $R_{n+n}$, and the doped region 310-$n$ has a resistance $R_{n++}$, where $R_n > R_{n+1} > R_{n+2} > R_{n+3}, \ldots, R_{n+n} > R_{n++}$.

The L-shaped PN junction 104 J forms a diode $D_j$ having a leakage resistance $R_L$. The PN junctions $J_1, J_2, \ldots, J_n, J_{n+1}, J_{n+2}, \ldots, J_{2n}$ form diodes PN junctions $D_{j1}, D_{j2}, \ldots, D_{jn}, D_{jn+1}, D_{jn+2}, \ldots, D_{j2n}$ having leakage resistances $R_{L1}, R_{L2}, \ldots, R_{Ln}, R_{Ln+1}, R_{Ln+2}, \ldots, R_{L2n}$, respectively. The diodes $D_j, D_{j2}$, and $D_{jn+2}$, and so on, $D_{jn}$, and $D_{j2}n$ have the same polarity that is opposite to the polarity of the diodes $D_{j1}, D_{jn+1}$, and so on. In use, a voltage source 320 is connected across the optical modulator 300 to reverse bias the diode $D_j$. Due to the polarities of the $D_j, D_{j2}, \ldots, D_{jn}, D_{jn+1}, D_{jn+2}, \ldots, D_{j2n}$, when the voltage source 220 is connected across the optical modulator 300 to reverse bias the diode $D_j$, the diodes $D_j$, $D_{j2}$, and $D_{jn+2}$, and so on, $D_{jn}$, and $D_{j2}n$ are reverse biased, and the diodes $D_{j1}$, $D_{jn+1}$, and so on are forward biased.

While the alternately doped regions 200, 300-1, 300-2, . . . , 300-(n−1), 300-n, 210, 310-1, 310-2, . . . , 310-(n−1), and 310-n are shown symmetrically arranged on either side of the L-shaped PN junction 104, the alternately doped regions can also be arranged asymmetrically on either side of the L-shaped PN junction 104. For example, the number of doped regions on either side of the L-shaped PN junction 104 need not be symmetrical. Further, the doping concentrations in the doped regions on either side of the L-shaped PN junction 104 need not increase symmetrically and may be varied differently than that described above. Furthermore, the lengths of doped regions on either side of the L-shaped PN junction 104 need not decrease symmetrically and may be varied differently than that described above.

Figure 4:
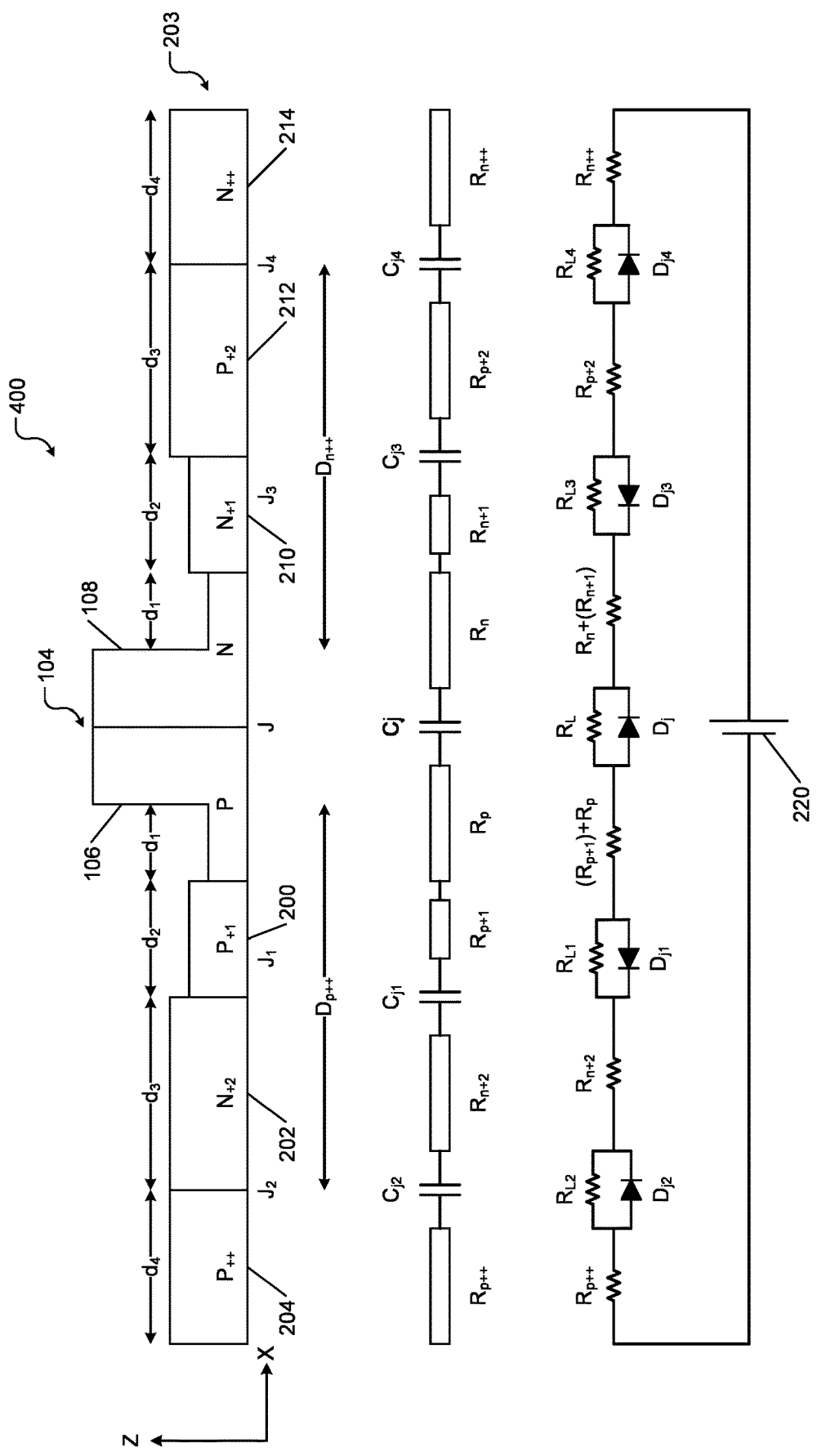
FIG. 4 shows an example of an optical modulator comprising a main PN junction and a plurality PN junctions formed by a plurality of doped regions of alternating polarities disposed on either side of the main PN junction where the doped regions of the PN junctions are etched to different depths.

FIG. 4 shows an optical modulator 400 according to the present disclosure. The optical modulator 400 comprises a waveguide 203 formed on a slab of silicon. The optical modulator 400 differs from the optical modulator 201 shown in FIG. 2 in that the base portions of the L-shaped PN junction 104 and some of the doped regions shown in FIG. 2 are etched in varying proportions to generate a stepped (ladder-shaped) modulator. The optical modulator 400 comprises the same L-shaped PN junction 104 of the optical modulator 201 shown in FIG. 2 except that the base portions of the first and second L-shaped portions 106, 108 of the L-shaped PN junction 104 are etched such that the height (i.e., thickness measured along an axis perpendicular to the plane in which the slab lies (i.e., the z-axis depicted in FIG. 4)) of the base portions is reduced compared to that shown in FIG. 2.

Additionally, as depicted in FIG. 4, the doped regions 200 and 210 are etched such that the height (i.e., thickness measured along an axis perpendicular to the plane in which the slab lies (i.e., the z-axis depicted in FIG. 4)) of the doped regions 200 and 210 is less than the height (i.e., thickness measured along an axis perpendicular to the plane in which the slab lies (i.e., the z-axis depicted in FIG. 4)) of the doped regions 202, 212 and greater than the height (i.e., thickness measured along an axis perpendicular to the plane in which the slab lies (i.e., the z-axis depicted in FIG. 4)) of the base portions of the first and second L-shaped portions 106, 108 of the L-shaped PN junction 104. Thus, the heights (i.e., thicknesses measured along an axis perpendicular to the plane in which the slab lies (i.e., the z-axis depicted in FIG. 4)) of the base portions of the first and second L-shaped portions 106, 108 of the L-shaped PN junction 104 and the doped regions 200, 202, 210, 212 increase as the distance of the doped regions 200, 202, 210, 212 increases from the L-shaped PN junction 104.

The stepped increase in the heights (i.e., thicknesses measured along an axis perpendicular to the plane in which the slab lies (i.e., the z-axis depicted in FIG. 4)) of the base portions of the first and second L-shaped portions 106, 108 of the L-shaped PN junction 104 and the doped regions 200, 202, 210, 212 gives the optical modulator 400 the shape of a ladder or steps of a staircase. All other features such as doping concentrations etc. of the first and second L-shaped portions 106, 108 of the L-shaped PN junction 104 and the doped regions 200, 202, 204, 210, 212, 214 remain the same as shown and described with reference to FIG. 2 and are therefore not repeated for brevity.

Figure 5:
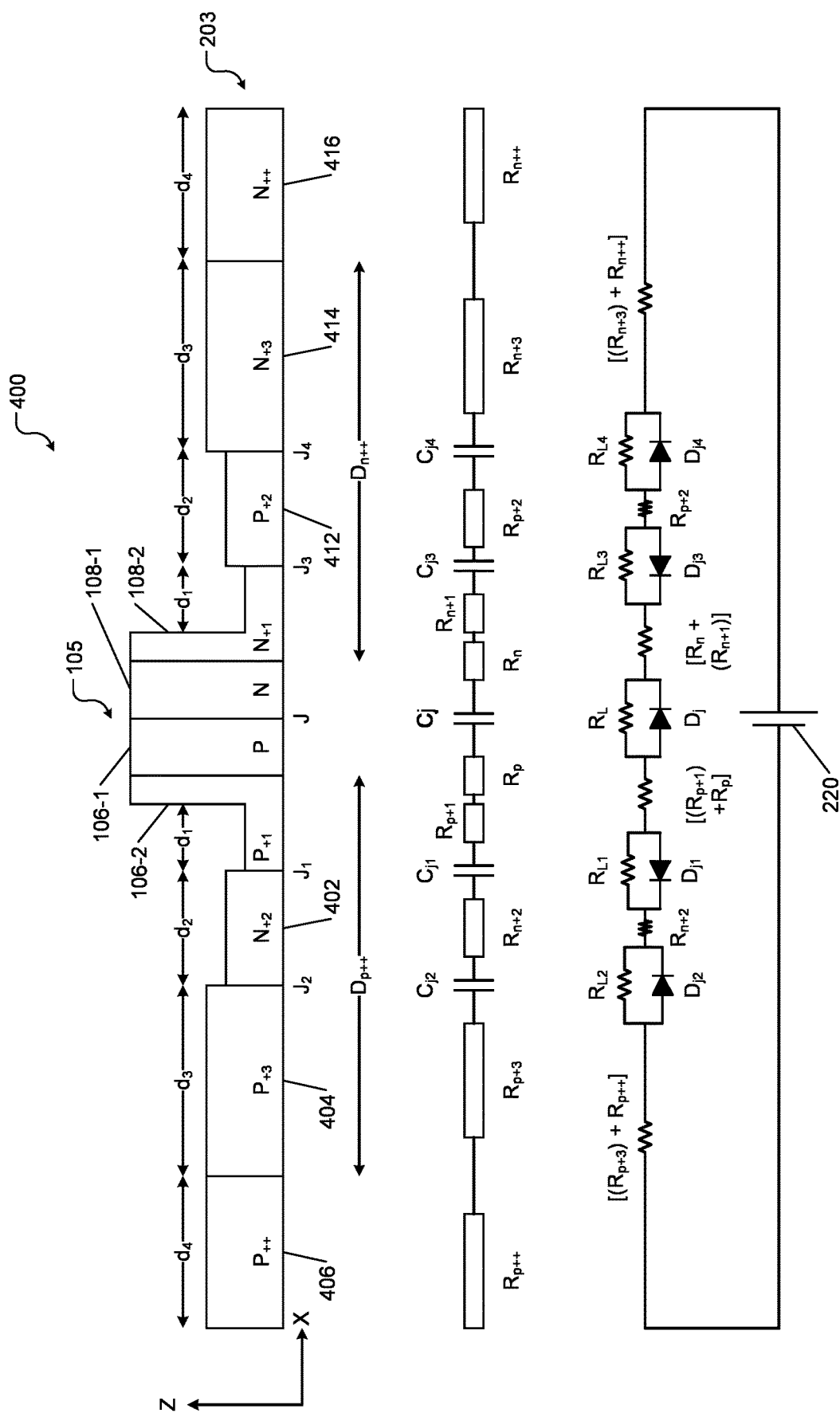
FIG. 5 shows an example of an optical modulator similar to that shown in FIG. 4 except that the main PN junction has a different structure than that shown in FIG. 4.

FIG. 5 shows an optical modulator 500 comprising a PN junction 105 according to the present disclosure. The optical modulator 500 differs from the optical modulator 400 shown in FIG. 4 in that the PN junction 105 of the optical modulator 500 is not formed by L-shaped regions. Rather, the PN junction 105 of the optical modulator 500 is formed by joining two rectangular regions 106-1 and 108-1 doped with p-type and n-type doping levels P and N, respectively. Two L-shaped regions 106-2 and 108-2 doped with p-type and n-type doping levels $P_+$ and $N_+$ abut the two rectangular regions 106-1 and 108-1, respectively. The two L-shaped regions 106-2 and 108-2 each have the same type of doping (i.e., P and N) as the adjacent rectangular regions 106-1 and 108-1, respectively. However, the two L-shaped regions 106-2 and 108-2 each have a higher doping (i.e., $P_{+1}$ and $N_{+1}$) than the adjacent rectangular regions 106-1 and 108-1, respectively, where $P_{+1} > P$ and $N_{+1} > N$.

Each of the two L-shaped regions 106-2, 108-2 includes a base portion that extends along an axis parallel to the slab (i.e., the x-axis depicted in FIG. 5) and a vertical portion extending from the base portion along an axis that is perpendicular to the slab (i.e., the z-axis depicted in FIG. 5). In other words, each of the two L-shaped regions 106-2, 108-2 comprises a respective first portion (i.e., a respective vertical portion) and a respective second portion (i.e., a respective base portion). Each first portion is elongated along an axis perpendicular to the plane in which the slab lies (i.e., the z-axis depicted in FIG. 5), and each second portion is elongated along an axis parallel to the plane in which the slab lies (i.e., the x-axis depicted in FIG. 5). Each of the two L-shaped regions 106-2, 108-2 is monolithic. That is, in each of the two L-shaped regions 106-2, 108-2, the base and vertical portions are not two pieces that are joined to each other but are one piece. The vertical portions of the two L-shaped regions 106-2, 108-2 have a smaller width (distance measured along the horizontal axis that is parallel to the slab (i.e., the x-axis depicted in FIG. 5)) than the two rectangular regions 106-1 and 108-1. The two rectangular regions 106-1 and 108-1 and the two L-shaped regions 106-2 and 108-2 have the same height (i.e., thickness measured along an axis perpendicular to the plane in which the slab lies (i.e., the z-axis depicted in FIG. 5)).

Instead of having the L-shaped region 106 with p-type doping level P and a p-type doped region 200 with doping level $P_+$ abutting the L-shaped region 106 as in the optical modulator 400 shown in FIG. 4, in the optical modulator 500, the L-shaped region 106-2 with p-type doping level $P_+$ abuts the rectangular region 106-1 with p-type doping level P. Similarly, instead of having the L-shaped region 108 with n-type doping level N and an n-type doped region 210 with doping level $N_+$ abutting the L-shaped region 108 as in the optical modulator 400 shown in FIG. 4, in the optical modulator 500, the L-shaped region 108-2 with n-type doping level $N_+$ abuts the rectangular region 108-1 with n-type doping level N.

As a result of this configuration, due to the additional doping in the two L-shaped regions 106-2, 108-2, the sum of the resistance $R_{p+}$ of the L-shaped region 106-2 and the resistance $R_p$ of the rectangular region 106-1 in the optical modulator 500 is less than the resistance $R_p$ of the L-shaped region 106 $R_p$ in the optical modulator 400. Similarly, the sum of the resistance $R_{n+}$ of the L-shaped region 108-2 and the resistance $R_n$ of the rectangular region 108-1 in the optical modulator 500 is less than the resistance $R_n$ of the L-shaped region 108 in the optical modulator 400.

Further, since the PN junction 105 is formed by the two rectangular regions 106-1, 108-1, which have a smaller area than the L-shaped PN junction 104 of the optical modulator 400, the PN junction 105 of the optical modulator 500 is smaller in size than the L-shaped PN junction 104 of the optical modulator 400. As a result, the capacitance of the PN junction 105 is also less than the capacitance of the PN junction 104. Therefore, the RC time constant of the PN junction 105 is less than the RC time constant of the PN junction 104, and the optical modulator 500 has higher bandwidth than the optical modulator 400.

The optical modulator 500 comprises a plurality of doped regions of alternating doping types disposed on each side of the two L-shaped regions 106-2, 108-2. The doped regions of alternating doping types form additional PN junctions on each side of the first and second L-shaped regions 106-2, 108-2 as follows. The two L-shaped regions 106-2, 108-2 are hereinafter called the first and second L-shaped regions 106-2, 108-2 for clarity of the following description. In an embodiment (not depicted), the respective dimensions of the different regions along an axis perpendicular to the slab are uniform (i.e., the z-axis depicted in FIG. 5).

As depicted in FIG. 5, doped regions 402, 404, and 406 are disposed on the left side of the first L-shaped region 106-2, and doped regions 412, 414, and 416 are disposed on the right side of the second L-shaped region 108. On the left side of the first L-shaped region 106-2, the doped region 402 abuts the base portion of the first L-shaped region 106-2. The doped region 404 abuts the doped region 402. The doped region 406 abuts the doped region 404. The doped region 402 has an opposite type of doping (n-type) than the first L-shaped region 106-2. The doped region 404 has an opposite type of doping (p-type) than the doped region 402. The doped region 406 has the same type of doping (n-type) as the doped region 404. The doped region 402 and the first L-shaped region 106-2 form a PN junction $J_1$, and the doped regions 404 and 402 form a PN junction $J_2$.

The base portion of the first L-shaped region 106-2 extends horizontally to a distance $d_1$ from an outer edge of the rectangular region 106-1 of the PN junction 105. The doped region 402 extends horizontally from the base portion of the first L-shaped region 106-2 to a distance $d_2$. The doped region 404 extends from the doped region 402 horizontally to a distance $d_3$. The doped region 406 extends horizontally from the doped region 404. The base portion of the first L-shaped region 106-2 and the doped regions 402, 404, 406 are coplanar.

In some embodiments, as depicted in FIG. 5, the base portion of the first L-shaped region 106-2 and the doped region 402 are etched in varying proportions to generate a stepped (ladder-shaped) modulator while in other embodiments (not shown), the respective dimensions of the different regions along an axis perpendicular to the slab are uniform (i.e., the z-axis depicted in FIG. 5). For example, as shown in FIG. 5, the base portion of the first L-shaped region 106-2 and the doped region 402 are etched such that the height (i.e., thickness measured along an axis perpendicular to the plane in which the slab lies (i.e., the z-axis depicted in FIG. 5)) of the base portion of the first L-shaped region 106-2 is reduced compared to the doped region 402 and the height (i.e., thickness measured along an axis perpendicular to the plane in which the slab lies (i.e., the z-axis depicted in FIG. 5)) of the doped region 402 is reduced compared to the doped region 404. The doped regions 404 and 406 have the same height (i.e., thickness measured along an axis perpendicular to the plane in which the slab lies (i.e., the z-axis depicted in FIG. 5)).

Thus, the heights (i.e., thicknesses measured along an axis perpendicular to the plane in which the slab lies (i.e., the z-axis depicted in FIG. 5)) of the base portion of the first L-shaped region 106-2 and the doped regions 402 and 404 increase as the distance of the doped regions 402 and 404 increases from the PN junction 105. The stepped increase in the heights (i.e., thicknesses measured along an axis perpendicular to the plane in which the slab lies (i.e., the z-axis depicted in FIG. 5)) of the base portion of the first L-shaped region 106-2 and the doped regions 402 and 404 gives the optical modulator 500 the shape of a ladder or steps of a staircase.

On the right side of the second L-shaped region 108-2, as depicted in FIG. 5, the doped region 412 abuts the base portion of the second L-shaped region 108-2. The doped region 414 abuts the doped region 412. The doped region 416 abuts the doped region 414. The doped region 412 has an opposite type of doping (p-type) than the second L-shaped region 108-2. The doped region 414 has an opposite type of doping (n-type) than the doped region 412. The doped region 416 has the same type of doping (n-type) as the doped region 414. The doped region 412 and second L-shaped region 108-2 form a PN junction $J_3$, and the doped regions 414 and 412 form a PN junction $J_4$.

The base portion of the second L-shaped region 108-2 extends horizontally to a distance $d_1$ from an outer edge of the rectangular region 108-1 of the PN junction 105. The doped region 412 extends horizontally from the base portion of the second L-shaped region 108-2 to a distance $d_2$. The doped region 414 extends from the doped region 412 horizontally to a distance $d_3$. The doped region 416 extends horizontally from the doped region 414. The base portion of the second L-shaped region 108-2 and the doped regions 412, 414, 416 are coplanar. The base portions of the first and second L-shaped regions 106-2, 108-2 and the doped regions 402, 404, 406, 412, 414, 416 are coplanar.

The base portion of the second L-shaped region 108-2 and the doped region 412 are etched in varying proportions to generate a stepped (ladder-shaped) modulator. The base portion of the second L-shaped region 108-2 and the doped region 412 are etched such that the height (i.e., thickness measured along an axis perpendicular to the plane in which the slab lies (i.e., the z-axis depicted in FIG. 5)) of the base portion of the second L-shaped region 108-2 is reduced compared to the doped region 412 and the height (i.e., thickness measured along an axis perpendicular to the plane in which the slab lies (i.e., the z-axis depicted in FIG. 5)) of the doped region 412 is reduced compared to the doped region 414. The doped regions 414 and 416 have the same height (i.e., thickness measured along an axis perpendicular to the plane in which the slab lies (i.e., the z-axis depicted in FIG. 5)).

Thus, the heights (i.e., thicknesses measured along an axis perpendicular to the plane in which the slab lies (i.e., the z-axis depicted in FIG. 5)) of the base portion of the second L-shaped region 108-2 and the doped regions 412 and 414 increase as the distance of the doped regions 412 and 414 increases from the PN junction 105. The stepped increase in the heights (i.e., thicknesses measured along an axis perpendicular to the plane in which the slab lies (i.e., the z-axis depicted in FIG. 5)) of the base portion of the second L-shaped region 108-2 and the doped regions 412 and 414 gives the optical modulator 500 the shape of a ladder or steps of a staircase.

The doping concentration (i.e., the doping level) $P_{+1}$ of the first L-shaped region 106-2 is greater than the doping concentration P of the rectangular region 106-1 of the PN junction 105. The doping concentration (i.e., the doping level) $N_{+1}$ of the second L-shaped region 108-2 is greater than the doping concentration N of the rectangular region 108-1 of the PN junction 105. The doping concentration $N_{+2}$ of the doped region 402 is greater than the doping concentration $N_{+1}$ of the second L-shaped region 108-2. The doping concentration $P_{+2}$ of the doped region 412 is greater than the doping concentration $P_{+1}$ of the first L-shaped region 106-2. The doping concentration $N_{+3}$ of the doped region 414 is greater than the doping concentration $N_{+2}$ of the doped region 402. The doping concentration $P_{+3}$ of the doped region 404 is greater than the doping concentration $P_{+2}$ of the doped region 412. The doping concentration $P_{++}$ of the doped region 406 is greater than the doping concentration $P_{+3}$ of the doped region 404. The doping concentration $N_{++}$ of the doped region 416 is greater than the doping concentration $N_{+3}$ of the doped region 414. $P_{++}>P_{+3}>P_{+2}>P_{+1}>P$, and $N_{++}>N_{+3}>N_{+2}>N_{+1}>N$.

Further, the doping concentrations of the first L-shaped region 106-2 and the doped regions 402, 404, 406 increase as the distance of the first L-shaped region 106-2 and the doped regions 402, 404, 406 increases from the PN junction 105. That is, $P_{++}>P_{+3}>N_{+2}>P_{+1}>P$. The doping concentrations of the second L-shaped region 108-2 and the doped regions 412, 414, 416 increase as the distance of the second L-shaped region 108-2 and the doped regions 412, 414, 416 increases from the PN junction 105. That is, $N_{++}>N_{+3}>P_{+2}>N_{+1}>N$.

Furthermore, while not shown, the lengths of the base portion of the first L-shaped region 106-2 and the doped regions 402, 404, 406 along a horizontal axis (i.e., an axis parallel to the plane of the slab (i.e., the x-axis depicted in FIG. 5)) can be decreased as the distance of the first L-shaped region 106-2 and the doped regions 402, 404, 406 increases from the L-shaped PN junction 104. That is, the length of the doped region 406 can be less than the length of the doped region 404, and the length of the doped region 404 can be less than the length of the doped region 402. The length of the doped region 402 can be less than the length of the base portion of the first L-shaped region 106-2. The In other words, $d_1>d_2>d_3$ and so on.

Similarly, the lengths of the base portion of the second L-shaped region 108-2 and the doped regions 412, 414, 416 along a horizontal axis (i.e., an axis parallel to the slab (i.e., the x-axis depicted in FIG. 5)) can be decreased as the distance of the second L-shaped region 108-2 and the doped regions 412, 414, 416 increases from the L-shaped PN junction 104. That is, the length of the doped region 416 can be less than the length of the doped region 414, and the length of the doped region 414 can be less than the length of the doped region 412. The length of the doped region 412 can be less than the length of the base portion of the second L-shaped region 108-2. The In other words, $d_1>d_2>d_3$ and so on.

The combination of increasing doping levels in the base portions of the first and second L-shaped regions 106-2, 108-2 and the doped regions 402, 404, 406, 412, 414, 416, and decreasing lengths of the base portions of the first and second L-shaped regions 106-2, 108-2 and the doped regions 402, 404, 406, 412, 414, 416 as the distance of the base portions of the first and second L-shaped regions 106-2, 108-2 and the doped regions 402, 404, 406, 412, 414, 416 increases from the PN junction 105 reduces the resistance of the optical modulator 500 and provides an optical modulator 500 that is compact compared to the optical modulators 100 and 201.

The equivalent circuit of the optical modulator 500 comprises a capacitance of the PN junction 105; resistances of the rectangular regions 106-1, 108-1; resistances of the first and second L-shaped regions 106-2, 108-2; capacitances of the PN junctions $J_1$, $J_2$, $J_3$, $J_4$; and resistances of the doped regions 402, 404, 406, 412, 414, 416 connected in series with each other. The PN junction 104 J has a capacitance $C_j$. The rectangular region 106-1 has a resistance $R_p$. The first L-shaped region 106-2 has a resistance $R_{p+1}$. The rectangular region 108-1 has a resistance $R_n$. The second L-shaped region 108-2 has a resistance $R_{n+1}$. The PN junctions $J_1$, $J_2$, $J_3$, $J_4$ have capacitances $C_{j1}$, $C_{j2}$, $C_{j3}$, $C_{j4}$, respectively. The doped region 402 has a resistance $R_{n+2}$, the doped region 404 has a resistance $R_{p+3}$, and the doped region 406 has a resistance $R_{p++}$, where $(R_{p+}R_{p+1})>R_{p+2}>R_{p++}$. The doped region 412 has a resistance $R_{p+2}$, the doped region 414 has a resistance $R_{n+3}$, and the doped region 416 has a resistance $R_{n++}$, where $(R_{n+}R_{n+1})>R_{n+2}>R_{n++}$.

The PN junction 105 J forms a diode $D_j$ having a leakage resistance $R_L$. The PN junctions $J_1$, $J_2$, $J_3$, $J_4$ form diodes PN junctions $D_{j1}$, $D_{j2}$, $D_{j3}$, $D_{j4}$ having leakage resistances $R_{L1}$, $R_{L2}$, $R_{L3}$, $R_{L4}$, respectively. The diodes $D_j$, $D_{j2}$, and $D_{j4}$ have the same polarity that is opposite to the polarity of the diodes $D_{j1}$, $D_{j3}$. In use, a voltage source 220 is connected across the optical modulator 500 to reverse bias the diode $D_j$. Due to the polarities of the $D_{j1}$, $D_{j2}$, $D_{j3}$, $D_{j4}$, when the voltage source 220 is connected across the optical modulator 500 to reverse bias the diode $D_j$, the diodes $D_j$, $D_{j2}$, and $D_{j4}$ are reverse biased, and the diodes $D_{j1}$, $D_{j3}$ are forward biased.

While the alternately doped regions 402, 404, 406, 412, 414, 416 are shown symmetrically arranged on either side of the PN junction 105, the alternately doped regions can also be arranged asymmetrically on either side of the PN junction 105. For example, the number of doped regions on either side of the PN junction 105 need not be symmetrical. Further, the doping concentrations in the doped regions on either side of the PN junction 105 need not increase symmetrically and may be varied differently than that described above. Furthermore, the lengths of doped regions on either side of the PN junction 105 need not decrease symmetrically and may be varied differently than that described above.

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

What is claimed is:

1. An optical modulator comprising:
a substrate defining a plane;
a first PN junction formed on the substrate by a first region doped with a p-type doping abutting a second region doped with an n-type doping;
a second PN junction formed, by a third region and a fourth region doped with opposite doping polarities, on the substrate adjacent to the second region of the first PN junction; and
a third PN junction formed, by a fifth region and a sixth region doped with opposite doping polarities, on the substrate adjacent to the first region of the first PN junction;
wherein the first through the sixth regions are arranged along a direction parallel to the plane and orthogonal to a direction propagation of light; and
wherein the first through the sixth regions are configured to form a single optical waveguide and to optimize modulation bandwidth of electro-optic modulation.

2. The optical modulator of claim 1 wherein the first region and the second region are L-shaped.

3. The optical modulator of claim 1 wherein:
the second PN junction is formed by the third region doped with an n-type doping disposed on the substrate adjacent to the second region of the first PN junction and the fourth region doped with a p-type doping disposed on the substrate abutting the third region, the n-type doping of the third region being of a different doping concentration than the n-type doping of the second region; and
the third PN junction is formed by the fifth region doped with a p-type doping disposed on the substrate adjacent to the first region of the first PN junction and the sixth region doped with an n-type doping disposed on the substrate abutting the fifth region, the p-type doping of the fifth region being of a different doping concentration than the p-type doping of the first region.

4. The optical modulator of claim 3 wherein:
each of the first region and the second region comprises a respective first portion and a respective second portion, each first portion being elongated along an axis perpendicular to the substrate, and each second portion being elongated along an axis parallel to the substrate; and
each of the third, fourth, fifth, and sixth regions has the same dimension along the axis perpendicular to the substrate as the second portions of the first region and the second region.

5. The optical modulator of claim 4 wherein dimensions of the second portion of the second region and the third and fourth regions along the axis parallel to the substrate are the same as the dimensions of the second portion of the first region and the fifth and sixth regions along the axis parallel to the substrate, respectively.

6. The optical modulator of claim 4 wherein:
dimensions of the second portion of the second region and the third and fourth regions along the axis parallel to the substrate decrease as distances of the second portion of the second region and the third and fourth regions along the axis parallel to the substrate increase from the first PN junction; and
dimensions of the second portion of the first region and the fifth and sixth regions along the axis parallel to the substrate decrease as distances of the second portion of the first region and the fifth and sixth regions along the axis parallel to the substrate increase from the first PN junction.

7. The optical modulator of claim 3 wherein:
each of the first region and the second region comprises a first portion and a second portion, the first portion being elongated along an axis perpendicular to the substrate, the second portion being elongated along an axis parallel to the substrate;
the first portions of the first region and the second region have a longer dimension along the axis perpendicular to the substrate than the second portions of the first region and the second region;
each of the third and fifth regions has a longer dimension along the axis perpendicular to the substrate than the second portions of the first region and the second region; and
each of the fourth and sixth regions has a longer dimension along the axis perpendicular to the substrate than the third and fifth regions.

8. The optical modulator of claim 7 wherein dimensions of the second portion of the second region and the third and fourth regions along the axis parallel to the substrate are the same as the dimensions of the second portion of the first region and the fifth and sixth regions along the axis parallel to the substrate, respectively.

9. The optical modulator of claim 7 wherein:
dimensions of the second portion of the second region and the third and fourth regions along the axis parallel to the substrate decrease as distances of the second portion of the second region and the third and fourth regions along the axis parallel to the substrate increase from the first PN junction; and
dimensions of the second portion of the first region and the fifth and sixth regions along the axis parallel to the substrate decrease as distances of the second portion of the first region and the fifth and sixth regions along the axis parallel to the substrate increase from the first PN junction.

10. The optical modulator of claim 3 wherein:
the third region has a higher doping concentration than the second region;
the sixth region has a higher doping concentration than the third region;
the fifth region has a higher doping concentration than the first region; and
the fourth region has a higher doping concentration than the fifth region.

11. The optical modulator of claim 3 further comprising:
a fourth PN junction is formed by the fourth region and a seventh region doped with an n-type doping disposed on the substrate abutting the fourth region; and
a fifth PN junction is formed by the sixth region and an eighth region doped with a p-type doping disposed on the substrate abutting the sixth region.

12. The optical modulator of claim 11 wherein:
each of the first region and the second region comprises a first portion and a second portion, the first portion extending along an axis perpendicular to the substrate, the second portion extending along an axis parallel to the substrate;
the first portions of the first region and the second region have a longer dimension along the axis perpendicular to the substrate than the second portions; and
each of the third, fourth, fifth, sixth, seventh, and eighth regions has the same dimension along the axis perpendicular to the substrate as the second portions of the first region and the second region.

13. The optical modulator of claim 12 wherein dimensions of the second portion of the second region and the third, fourth, and seventh regions along the axis parallel to the substrate are the same as the dimensions of the second portion of the first region and the fifth, sixth, and eighth regions along the axis parallel to the substrate, respectively.

14. The optical modulator of claim 12 wherein:
dimensions of the second portion of the second region and the third, fourth, and seventh regions along the axis parallel to the substrate decrease as distances of the third, fourth, and seventh regions along the axis parallel to the substrate increase from the first PN junction; and
dimensions of the second portion of the first region and the fifth, sixth, and eighth regions along the axis parallel to the substrate decrease as distances of the fifth, sixth, and eighth regions along the axis parallel to the substrate increase from the first PN junction.

15. The optical modulator of claim 11 wherein:
each of the first region and the second region comprises a first portion and a second portion, the first portion extending along an axis perpendicular to the substrate, the second portion extending along an axis parallel to the substrate;
the first portions of the first region and the second region have a longer dimension along the axis perpendicular to the substrate than the second portions of the first region and the second region;
each of the third and fifth regions has a longer dimension along the axis perpendicular to the substrate than the second portions of the first region and the second region;
each of the fourth and sixth regions has a longer dimension along the axis perpendicular to the substrate than the third and fifth regions; and
each of the seventh and eighth regions has the same dimension along the axis perpendicular to the substrate as the fourth and sixth regions.

16. The optical modulator of claim 11 wherein:
the third region has a higher doping concentration than the second region;
the sixth region has a higher doping concentration than the third region;
the seventh region has a higher doping concentration than the sixth region;
the fifth region has a higher doping concentration than the first region;
the fourth region has a higher doping concentration than the fifth region; and
the eighth region has a higher doping concentration than the fourth region.

17. The optical modulator of claim 13 wherein dimensions of the second portion of the second region and the third, fourth, and seventh regions along the axis parallel to the substrate are the same as the dimensions of the second portion of the first region and the fifth, sixth, and eighth regions along the axis parallel to the substrate, respectively.

18. The optical modulator of claim 13 wherein:
dimensions of the second portion of the second region and the third, fourth, and seventh regions along the axis parallel to the substrate decrease as distances of the third, fourth, and seventh regions along the axis parallel to the substrate increase from the first PN junction; and
dimensions of the second portion of the first region and the fifth, sixth, and eighth regions along the axis parallel to the substrate decrease as distances of the fifth, sixth, and eighth regions along the axis parallel to the substrate increase from the first PN junction.

19. An optical modulator comprising:
a substrate defining a plane;
a first PN junction formed on the substrate by a first region doped with a p-type doping abutting a second region doped with an n-type doping;
a second PN junction formed, by the second region and a third region doped with a p-type doping, on the substrate adjacent to the second region of the first PN junction; and
a third PN junction formed, by the first region and a fourth region doped with an n-type doping, on the substrate adjacent to the first region of the first PN junction;
wherein the first region comprises a first p-type doped portion and a second p-type doped portion, the second p-type doped portion abutting the first p-type doped portion and having a higher doping concentration than the first p-type doped portion;
wherein the second region comprises a first n-type doped portion and a second n-type doped portion, the second n-type doped portion abutting the first n-type doped portion and having a higher doping concentration than the first n-type doped portion;
wherein the first through the fourth regions are arranged along a direction parallel to the plane and orthogonal to a direction propagation of light; and
wherein the first through the fourth regions are configured to form a single optical waveguide and to optimize modulation bandwidth of electro-optic modulation.

20. The optical modulator of claim 19 wherein:
the second PN junction is formed by the third region disposed on the substrate adjacent to the second n-type doped portion of the first PN junction, the third region having a higher doping concentration than the second p-type doped portion of the first PN junction; and
the third PN junction is formed by the fourth region disposed on the substrate adjacent to the second p-type doped portion of the first PN junction, the fourth region having a higher doping concentration than the second n-type doped portion of the first PN junction.

21. The optical modulator of claim 20 wherein:
each of the second p-type doped portion and the second n-type doped portion comprises a first portion and a second portion, the first portion extending along an axis perpendicular to the substrate, the second portion extending along an axis parallel to the substrate;
the first portions of the second p-type doped portion and the second n-type doped portion have a longer dimension along the axis perpendicular to the substrate than the second portions of the second p-type doped portion and the second n-type doped portion; and
each of the third and fourth regions has a longer dimension along the axis perpendicular to the substrate than the second portions of the second p-type doped portion and the second n-type doped portion.

22. The optical modulator of claim 21 further comprising:
a fourth PN junction formed by a fifth region doped with an n-type doping disposed on the substrate adjacent to the third region, the fifth region having a higher doping concentration than the fourth region and having a longer dimension along the axis perpendicular to the substrate than the third region; and
a fifth PN junction formed by a sixth region doped with a p-type doping disposed on the substrate adjacent to the fourth region, the sixth region having a higher doping concentration than the third region and having a longer dimension along the axis perpendicular to the substrate than the fourth region.

23. The optical modulator of claim 22 wherein dimensions of the second portion of the second n-type doped portion and the third and fifth regions along the axis parallel to the substrate are the same as the dimensions of the second portion of the second p-type doped portion and the fourth and sixth regions along the axis parallel to the substrate, respectively.

24. The optical modulator of claim 22 wherein:
dimensions of the second portion of the second portion of the second n-type doped portion and the third and fifth regions along the axis parallel to the substrate decrease as distances of the second portion of the second n-type doped portion and the third and fifth regions along the axis parallel to the substrate increase from the first PN junction; and
dimensions of the second portion of the second p-type doped portion and the fourth and sixth regions along the axis parallel to the substrate decrease as distances of the second portion of the second p-type doped portion and the fourth and sixth regions along the axis parallel to the substrate increase from the first PN junction.

* * * * *